United States Patent
Duan et al.

(10) Patent No.: US 12,311,764 B2
(45) Date of Patent: May 27, 2025

(54) SYSTEM AND METHOD FOR CONTROLLING LAMPLIGHT BY USING MUSIC, AND IN-VEHICLE INFOTAINMENT SYSTEM

(71) Applicant: Mobility Asia Smart Technology Co. Ltd., Beijing (CN)

(72) Inventors: Ning Duan, Beijing (CN); Tiecai Liu, Beijing (CN); Ou Li, Beijing (CN)

(73) Assignee: Mobility Asia Smart Technology Co. Ltd., Beijing (CN)

( * ) Notice: Subject to any disclaimer, the term of this patent is extended or adjusted under 35 U.S.C. 154(b) by 286 days.

(21) Appl. No.: 18/073,059

(22) Filed: Dec. 1, 2022

(65) Prior Publication Data
US 2023/0166594 A1 Jun. 1, 2023

(30) Foreign Application Priority Data
Dec. 1, 2021 (CN) .......................... 202111453953.X

(51) Int. Cl.
*B60K 35/00* (2024.01)
*B60K 35/26* (2024.01)
*B60K 35/29* (2024.01)

(52) U.S. Cl.
CPC ............. *B60K 35/00* (2013.01); *B60K 35/26* (2024.01); *B60K 35/29* (2024.01); *B60K 2360/188* (2024.01); *B60K 2360/332* (2024.01)

(58) Field of Classification Search
CPC .. B60K 35/26; B60K 35/29; B60K 2360/188; B60K 2360/332; B60K 2360/33; Y02B 20/40; B60Q 3/80
See application file for complete search history.

(56) References Cited

U.S. PATENT DOCUMENTS 10,194,505 B1 * 1/2019 Perera ................... H05B 45/20
11,071,182 B2 * 7/2021 Cremer .................. H05B 45/20
(Continued)

FOREIGN PATENT DOCUMENTS

CN   102319472 A   1/2012
CN   106332393 A   1/2017
(Continued)

OTHER PUBLICATIONS

CN 109017550 A with English translation; date filed Aug. 17, 2018; date published Dec. 18, 2018. (Year: 2018).*
(Continued)

*Primary Examiner* — Calvin Cheung
(74) *Attorney, Agent, or Firm* — ANOVA LAW GROUP, PLLC

(57) ABSTRACT

The disclosure relates to a system and method for controlling lamplight by using music, and an in-vehicle infotainment system. The system comprises: a music analysis unit, configured to analyze rhythm and content of music; and a lamplight control unit, configured to dynamically control, on the basis of the analysis of the rhythm and content of the music, at least one of color, brightness and variation rhythm of the color and brightness of lamplight emitted by light-emitting components. Embodiments of the present invention can achieve better integration between lamplight, music and scenes, so that a user obtains an improved acousto-optic experience.

23 Claims, 3 Drawing Sheets

(56) References Cited

U.S. PATENT DOCUMENTS

2013/0207572 A1* 8/2013 Tucker .................. H05B 45/20
  315/297
2018/0049298 A1* 2/2018 Benoit .................. H05B 47/12
2021/0160975 A1* 5/2021 Cremer ................. H05B 45/20

FOREIGN PATENT DOCUMENTS

| CN | 108174498 A | 6/2018 |
| CN | 108819839 A | 11/2018 |
| CN | 110264927 A | 9/2019 |

OTHER PUBLICATIONS

CN 104867457 A with English translation; date filed Feb. 21, 2014; date published Aug. 26, 2015. (Year: 2015).*

* cited by examiner

SYSTEM AND METHOD FOR CONTROLLING LAMPLIGHT BY USING MUSIC, AND IN-VEHICLE INFOTAINMENT SYSTEM

CROSS-REFERENCE TO RELATED APPLICATION

This application claims the priority of Chinese Patent Application No. 202111453953.x, filed on Dec. 1, 2021, the content of which is incorporated herein by reference in its entirety.

TECHNICAL FIELD

The disclosure relates to a system and method for controlling lamplight by using music, and an in-vehicle infotainment system.

BACKGROUND

When people listen to music outdoors, indoors or in a vehicle, it is often desired that lamplight varies along with the rhythm of the music, so as to obtain good audio-visual experience. For example, during use of a vehicle, in order to enable a user to have a more comfortable and more interesting driving experience, ambient lamplight and music in the vehicle are usually combined and presented to the user, for example, associating variation of the ambient lamplight with the rhythm of the music, so that the ambient lamplight varies along with the rhythm of the music. On occasions such as music fountains, concerts or outdoor squares, lamplight varies along with music rhythm, which is pleasant.

In the prior art, a problem commonly occurring is that it is generally only possible to simply achieve rhythm unison between lamplight variation and music melody, and it is difficult to achieve better integration between lamplight, music and scenes. For example, the content of music played back may not match the ambient lamplight, or the ambient lamplight does not match the real scene, causing the lamplight to be too bright or too dull, etc. Although the content of music can greatly improve the user experience, music content which does not match the real scene or the users emotion may deteriorate the user experience, and also cause the ambient lamplight to become just rhythm of the music, rather than presenting a pleasant atmosphere.

On the other hand, in a driving process, the screen of a vehicle-mounted host (HU head unit) is located within a line-of-sight range of a driver; however, when ambient lamplight and music are presented in the vehicle, the screen of the vehicle-mounted host does not participate in lamplight presentation, or only displays a background color, thereby failing to use the display screen of the vehicle-mounted host to bring a better experience to the user.

SUMMARY

An object of the disclosure to provide a system and method for controlling lamplight by using music, and an in-vehicle infotainment system, to overcome at least one of the described problems in the prior art.

According to one aspect of the disclosure, a system for controlling lamplight by using music is provided, the system comprising: a music analysis unit, configured to analyze rhythm and content of music; and a lamplight control unit, configured to dynamically control, on the basis of the analysis of the rhythm and content of the music, at least one of color, brightness and variation rhythm of the color and brightness of lamplight emitted by light-emitting components; wherein the lamplight control unit comprises a color encoder, the color encoder being configured to generate color coding on the basis of at least one of the rhythm and content of the music; and the lamplight control unit controls, on the basis of the color coding generated by the color encoder, colors of the lamplight emitted by the light-emitting components.

According to another aspect of the disclosure, a method for controlling lamplight by using music is provided, the method comprising: analyzing rhythm and content of music; and dynamically controlling, on the basis of the analysis of the rhythm and content of the music, at least one of color, brightness and variation rhythm of the color and brightness of lamplight emitted by light-emitting components; wherein the controlling step comprises: generating color coding on the basis of at least one of the rhythm and content of the music; and controlling, on the basis of the color coding, colors of the lamplight emitted by the light-emitting components.

According to yet another aspect of the disclosure, provided is an apparatus for providing scene music and atmosphere lamplight, the apparatus comprising: a plurality of light-emitting components; a music playback device; and the system for controlling lamplight by using music as described in the described aspect.

According to yet another aspect of the disclosure, provided is a vehicle, comprising the apparatus for providing scene music and atmosphere lamplight as described in the described aspect.

According to yet another aspect of the disclosure, provided is an in-vehicle infotainment (HU) system, the in-vehicle infotainment system comprising: a memory in which computer-executable instructions are stored; and at least one processor; wherein the computer-executable instructions, when being executed by the processor, cause the in-vehicle infotainment system to execute the method for controlling lamplight by using music as described in the described aspect, so as to dynamically control at least one of color, brightness and variation rhythm of the color and brightness of light emitted by a plurality of light-emitting components provided in an inner space of the vehicle and a display screen of the in-vehicle infotainment system.

Embodiments of the present invention can achieve better integration between lamplight, music and scenes, so as to improve the user experience.

DETAILED DESCRIPTION OF THE EMBODIMENTS

Hereinafter, embodiments of the present invention are further described with reference to the accompanying drawings.

Figure 1:
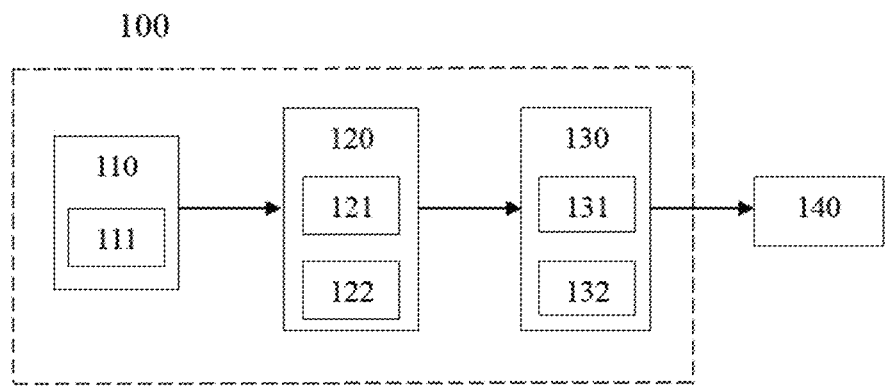
FIG. 1 shows a structural block diagram of a system for controlling lamplight by using music according to embodiments of the present invention.

FIG. 1 shows a structural block diagram of a system 100 for controlling lamplight by using music according to embodiments of the present invention. The system 100 comprises: a music analysis unit 120, configured to analyze rhythm and content of music; and a lamplight control unit 130, configured to dynamically control, on the basis of the analysis of the rhythm and content of the music, at least one of color, brightness and variation rhythm of the color and brightness of lamplight emitted by light-emitting components 140; the lamplight control unit 130 comprises a color encoder 131, the color encoder 131 being configured to generate color coding on the basis of at least one of the rhythm and content of the music; and the lamplight control unit 130 controls, on the basis of the color coding generated by the color encoder 131, colors of the lamplight emitted by the light-emitting components 140. In this embodiment, the lamplight control unit 130 can generate dynamically-varying lamplight control signals on the basis of the analysis of the rhythm and content of the music, can correspondingly control at least one of color, brightness and variation rhythm of the color and brightness of the lamplight, to achieve deep integration of lamplight and music, and can control light emission of the light-emitting components by using the color coding generated by the color encoder. The system 100 can produce a dynamically-varying and rich-colored color scheme which is sufficiently integrated with the rhythm and content of the music, thereby enabling the user to obtain an improved acousto-optic experience. In some embodiments, the system 100 further comprises a music selection unit 110, configured to select, on the basis of situations, music to be played back, such that the music, the lamplight and the situations coordinate with one another; wherein the situations comprise at least one of user preference, weather, time, user state, geographical position where the user is located and volume of music. The music selection unit 110 may be an input unit for the user to select, according to subjective factors such as preference or state of the user, music to be played back, so that the music and corresponding lamplight meet the user preference or are coordinated with the current state of the user. For example, playing back music that the user likes, such as music with gentle rhythm, passionate music, love music, film music, children's music, etc.; or when the user is in a fatigue state and it is desired that the user is refreshed (for example, when the user is driving a vehicle), music that can refresh the user is played back; and when the user (e.g. a child) is in a fatigue state and wants to sleep, music which has gentle and quiet rhythm and can have a hypnotic effect is played back. The music selection unit 110 may also be a unit that automatically selects, on the basis of objective factors such as weather, time and position, music to be played back, so that the music, corresponding lamplight and the objective factors coordinate with one another. For example, music about spring is played back in spring, music related to rain is played back during raining, music related to holidays is played back on holidays (e.g., Spring Festival), music related to sea is played back when the user is located at sea, and music related to forest is played back when the user is located in a forest.

In some embodiments, the user state may comprise at least one of physical fatigue state of the user, psychological state of the user and movement speed of the user. The music selection unit 110 may automatically select music on the basis of at least one of these user states, for example, selecting music that has faster rhythm and is passionate when the user is in an excited state or the user is in a high-speed movement state (e.g. in a vehicle having a high vehicle speed). The user state may be automatically detected by using corresponding sensors, or may be set by the user himself/herself by an input device.

In some embodiments, the music selection unit 110 comprises a music mode selection unit 111, the music mode selection unit 111 being configured to allow the user to select a music mode complying with the user preference on the music mode selection unit, wherein the music mode indicates the style of music to be played back; and the music selection unit 111 automatically selects, according to the selected music mode, music to be played back. In one example, selectable music modes on the music mode selection unit 111 comprise romantic mode, conversation mode, pregnancy mode, child mode, blessing mode, and smart mode. The romantic mode, conversation mode, blessing mode, pregnancy mode and child mode respectively indicate that the theme styles of the selected music are music theme styles of romantic (for example, being lyrical and full of fantasy), conversation (light music without lyrics), blessing (being happy and joyous), and suitable for pregnant women (for example, soft and warm, euphemistic and graceful) and children (for example, being bright and breezy); and the smart mode may be to automatically select, on the basis of objective factors or historical data, music to be played back. Selectable music modes on the music mode selection unit 111 may also comprise other modes, and the present invention is not limited to these modes as described above. The music selection unit 110 may further comprise a unit for selecting music in other manners, and is not limited to only comprise the music mode selection unit 111 of the described embodiment.

In some embodiments, the music analysis unit 120 comprises: a music rhythm analysis module 121, configured to analyze rhythm of the music; and a music content analysis module 122, configured to analyze content of the music. During playback time of the music, the music rhythm varies, and the music continuously presents rich content contained therein (for example, expressing a plurality of different themes or emotions, expressing a plurality of different scenes, and lyrics accompanied to the music). Correspondingly, the lamplight control unit 130 may dynamically control, on the basis of the current rhythm of the music and the currently presented content, at least one of color, brightness and variation rhythm of the color, brightness of the lamplight emitted by the light-emitting components 140. In an embodiment, on the basis of the analysis of the rhythm of the music by the music rhythm analysis module 121, the lamplight control unit 130 dynamically controls the variation rhythm of the lamplight emitted by the light-emitting components 140, so that the variation rhythm of the color and brightness of the lamplight is consistent with the rhythm of the music; and further on the basis of the analysis of the content of the music by the music content analysis module 122, the lamplight control unit 130 dynamically controls at least one of the color and brightness of the lamplight emitted by the light-emitting components 140, so that the color and/or brightness of the lamplight are coordinated with the content of the music.

The content of music may comprise at least one of style, scenes, and lyrics of the music; however, the present invention is not limited thereto, and the content of music may also comprise other connotation aspects of the music. The content of music may reflect the emotion and artistic conception expressed by the music, and according to the theory of color psychology, the color and brightness displayed by the lamplight may also express emotion and artistic conception. For example, red expresses liveliness, enthusiasm, sexiness, admiration and passion; orange expresses kindness, positive, progress and vitality; yellow expresses youth, optimism and warmth; green expresses nature, relaxation, peace and life; blue expresses sadness, comfort and calmness; purple expresses romance, fantasy and elegance; pink expresses tenderness, sweetness, romance and easy; and white expresses purity, holiness, goodness, trust and openness. In embodiments of the present invention, coordinating the color and/or brightness of the lamplight with the content of the music is to make the emotion and artistic conception expressed by the lamplight consistent with the emotion and artistic conception expressed by the music.

On the other hand, the rhythm of the music itself can also express emotion and artistic conception, for example, gentle rhythm can express calm, dream, relaxation and natural, and corresponds to emotions and artistic conceptions expressed by colors such as blue, purple and green; and fast-rhythm music can express joy, optimism, easy, positive and enthusiasm, and corresponds to emotions and artistic conceptions expressed by colors such as yellow, pink, orange and red. In another embodiment, the lamplight control unit 130 can dynamically control the color and brightness of the lamplight emitted by the light-emitting components 140 on the basis of the analysis of the rhythm of the music by the music rhythm analysis module 121 and the analysis of the content of the music by the music content analysis module 122, and can dynamically control the variation rhythm of the color and brightness on the basis of the analysis of the rhythm of the music by the music rhythm analysis module 121.

In some embodiments, the system 100 may also comprise a music theme dictionary, the music theme dictionary containing various themes expressed by music rhythm and content, and colors corresponding thereto. For example, the music theme dictionary may contain emotion color palette based on color psychology. The music analysis unit 120 analyzes the rhythm and content of the music, and can determine the emotions or artistic conceptions expressed by the rhythm and content of the music; and the lamplight control unit 130 may select colors corresponding to these emotions or artistic conceptions in the emotion color palette, and control the light-emitting components 140 to present corresponding colors in the lamplight emitted thereby. The emotion color palette may comprise various emotions, artistic conceptions and colors corresponding thereto as exemplified above.

In some embodiments, the music content analysis module 122 is further configured to analyze at least one of style, scene and lyrics of the music, to extract features related to at least one of the style, scene and lyrics of the music, and to classify at least one of the style, scene and lyrics of the music by using a machine learning algorithm; and the lamplight control unit 130 is further configured to dynamically control color and brightness of lamplight based at least in part on the classification of at least one of the style, scene and lyrics of the music, and to dynamically control variation rhythm of the color and brightness of the lamplight based at least in part on situations and the analysis of the music rhythm analysis module 121; wherein the situations comprise at least one of user preference, weather, time, user state, geographical position where the user is located and volume of music. In an embodiment, the styles, scenes and lyrics of music may be classified into corresponding emotions or artistic conceptions, so that the lamplight control unit 130 may control, on the basis of the current style, scene or lyrics of the music, the light-emitting components 140 to emit lamplight having color and brightness corresponding to the emotion or artistic conception to which the style, scene or lyrics are classified. The situations may be set by the user or set automatically. A sensor for detecting the user state may be provided in the system 100, to detect the user state.

In a process of classifying content of music, the machine learning algorithm may be used to establish a model and perform feature extraction and training, so as to obtain a continuously-improving classifier model, which is used to classify the music content in terms of emotions and artistic conceptions expressed thereby. For example, when playing back the song "Yesterday Once More" of Carpenters, the background music and lyrics are presented: "When I was young I'd listen to the radio. Waiting for my favorite songs. When they played I'd sing along. It made me smile . . . ". In the process of lyrics classification, for the lyrics content in the song music, lyrics segmenting (for example, regarding the described lyrics in "Yesterday Once More", a sentence can be taken as a unit, and the described lyrics are divided into four segments, in which the four segments respectively express different emotions and artistic conceptions), context information correlation analysis, extraction of keywords in the lyrics, and feature extraction and analysis, etc. are performed, so as to classify the emotions or artistic conceptions expressed by the segmented lyrics, and add corresponding classification labels. The lamplight control unit 130 may control, on the basis of the classification label of the current lyrics segment, the light-emitting components 140 to emit lamplight having color and brightness corresponding to the emotion or artistic conception to which the lyrics segment is classified.

The style of music refers to representative unique appearance presented by music works as a whole, i.e. music type. Different music styles can express different emotions or artistic conceptions, and the theme or name of the music can also reflect the emotion or artistic conception expressed thereby. For example, light music has simple structure, lively rhythm and beautiful melody, which can create a warm and romantic atmosphere and has a leisure nature; classical music has profound connotation, and is classical and elegant; country music has simple tune, stable rhythm, and has narrative and local flavor; and rock music can express various emotions and artistic conceptions such as fanaticism, passion and rebellion. The music content analysis module 122 can analyze segments in the music, extract features (comprising the theme or name of the music) related to the style of the music, judge the type of the music and the emotion and artistic conception expressed thereby, and then classify the style of the music by using the machine learning algorithm; and the lamplight control unit 130 can further dynamically control the color and brightness and variation rhythm of the color and brightness of the lamplight on the basis of the classification of the music style. In another example, the style of the music can be analyzed by a combination of the music rhythm analysis module 121 and the music content analysis module 122, to classify music or music clips.

Music scene refers to a scene described by the music, such as natural scenery (such as sea, river, grassland, etc.), festival celebration scene, wedding scene, bar scene, war scene, etc. A segment of music can describe several different scenes. The music content analysis module 122 analyzes the scene of the music (for example, according to the theme or name of the music and elements in music clips), extracts features related to the scene of the music, compares same with classical scene music elements, and classifies the scene of the music by using the machine learning algorithm; and the lamplight control unit 130 further dynamically controls the color and brightness of the lamplight based at least in part on the classification of the scene of the music, and controls variation rhythm of the color and brightness of the lamplight based at least in part on the situations and the analysis of the music rhythm analysis module 121, so that the user can sense the scene described by the music through the music and lamplight. For example, when playing back music clips related to sea, the color of the lamplight is made to present blue; when playing back music clips related to grassland, the color of the lamplight is made to present green; and when playing back music clips related to festival celebration, the color of the lamplight is made to present red, and flashes with the rhythm of the music.

In some embodiments, the light-emitting components 140 comprise a plurality of light-emitting components; the lamplight control unit 130 further comprises a color mixer 132; the color encoder 132 is configured to generate the color coding on the basis of emotion or artistic conception expressed by at least one of rhythm, style, scene and lyrics of the music analyzed by the music analysis unit 120; the color mixer 132 is configured to generate a color mixing scheme expressing a plurality of emotions or artistic conceptions on the basis of the generated color coding; and the lamplight control unit 130 is configured to control, on the basis of the generated color mixing scheme, colors of the lamplight emitted by the plurality of light-emitting components 140.

The plurality of light-emitting components 140 can be arranged in combination with one another according to a specific pattern. For example, a plurality of lamp tubes are arranged inside the vehicle along doors on two sides, a front side window, and a rear side window, to form a rectangular box-shaped atmosphere lamplight structure. In the atmosphere lamplight structure, the lamplight control unit 130 can control various light-emitting components 140, to present a color mixing scheme expressing multiple emotions or artistic conceptions in the music in a temporal and spatial combination manner by using light emission colors of the light-emitting components 140.

In some embodiments, the color mixing scheme comprises at least one of a combination scheme of a plurality of colors in different spaces, a switching scheme of a plurality of colors in different time periods, and a mixed color scheme of a plurality of colors. The combination scheme of a plurality of colors in different spaces may be: in an overall space of the atmosphere lamplight structure, a plurality of colors are presented at the same time to express a plurality of emotions or artistic conceptions. For example, different lamplight colors can be used to present emotions or artistic conceptions expressed by primary melody and secondary melody occurring simultaneously in music, colors presenting the primary melody can occupy a larger light-emitting space (i.e. large light-emitting color blocks) in the atmosphere lamplight structure, and colors presenting the secondary melody can occupy a smaller light-emitting space (i.e. small light-emitting color blocks) in the atmosphere lamplight structure. These color blocks presented by the plurality of light-emitting components 140 can constitute a lamplight composition for the color mixing scheme. By the control of the lamplight control unit 130, a lamplight effect in which small light-emitting blocks flow or flash in large light-emitting blocks may also be presented. The switching scheme of a plurality of colors in different time periods may be: in an overall space of the atmosphere lamplight structure, different plurality of colors are presented in different time periods to express a plurality of emotions or artistic conceptions. For example, emotions or artistic conceptions expressed by factors such as primary melody, secondary melody and lyrics appearing in music in a temporal order may be presented by using different lamplight colors, and as the primary melody, the secondary melody and the lyrics in the music appear in turn in different time periods, lamplight colors expressing corresponding emotions or artistic conceptions are presented in a manner of performing lamplight switching in corresponding time periods. The mixed color scheme of a plurality of colors may be: in an overall space of the atmosphere lamplight structure, a mixed color expressing mixing of a plurality of emotions or artistic conceptions is presented; for example, blue and red are mixed to purple, red and yellow are mixed to orange, and yellow and blue are mixed to green. The described color mixing schemes may be used in combination. However, the present invention is not limited to the described three color mixing schemes, and other color mixing schemes may also be used.

In some embodiments, the color encoder 131 comprises a first color encoder, the first color encoder being configured to generate corresponding first color coding on the basis of the classification of at least one of style, scene and lyrics of the music; wherein the first color coding indicates a light emission color of each of the light-emitting components 140 and/or an overall pattern constituted by light emission colors of the plurality of light-emitting components 140; and the lamplight control unit 130 is further configured to generate, on the basis of the first color coding, control signals for controlling light emission colors of the plurality of light-emitting components 140. The atmosphere lamplight is usually provided by a plurality of light-emitting components in combination according to a specific arrangement structure. The first color coding generated by the first color encoder can not only indicate a light emission color of each light-emitting component and allow for color matching of light emitted by the light-emitting components, but also can indicate an overall pattern constituted by lamplight emitted by each light-emitting component of the plurality of light-emitting components 140 at each moment, thereby making the emotion or artistic conception expressed by the overall light-emitting pattern of the plurality of light-emitting components 140 to be integrated and coordinated with the rhythm and/or the content of the music. For example, the lamplight control unit 130 can control the plurality of light-emitting components 140, to produce an effect that blue blocks flow in the plurality of light-emitting components 140, to create a sea water scene; and to produce a wide range of green to create a forest scene.

In another embodiment, the color mixer 132 is configured to generate a mixed scene effect based on a multi-color scheme according to a plurality of color coding generated by the first color encoder and the arrangement scheme of the light-emitting components, to obtain an overall light-emitting color scheme integrated with music and scene in which multiple light strips are mixed and multiple colors are soft, so as to achieve a corresponding overall acousto-optic experience effect.

In some embodiments, the lamplight control unit 130 controls emotion or artistic conception expressed by light emission colors of the light-emitting components 140 to coordinate with emotion or artistic conception expressed by at least one of style, scene, and lyrics of the music. In this way, music and lamplight can be integrated.

In some other embodiments, the color encoder 132 comprises a second color encoder; the second color encoder comprises a label color encoder and a mode color encoder; the label color encoder is configured to generate second color coding according to a classification label of content (such as at least one of style, scene and lyrics of the music) of the music; the mode color encoder is configured to generate third color coding according to situations and the selected music mode; the second color encoder is further configured to generate combined color coding on the basis of the second color coding and the third color coding; the combined color coding indicates a light emission color of each light-emitting component of the plurality of light-emitting components 140 and/or an overall color scheme constituted by light emission colors of the plurality of light-emitting components 140; wherein classification labels of content of the music indicate classification of the content of the music; the situations comprise at least one of user preference, weather, time, user state, geographical position where the user is located and volume of music; the music mode indicates the style of music selected by the user; and the lamplight control unit 130 is further configured to generate, on the basis of the overall color scheme, control signals for controlling light emission colors of the plurality of light-emitting components 140. In this embodiment, music to be played back can be automatically selected on the basis of the situations and/or the selected music mode. Thus, comprehensive color coding may be generated on the basis of factors such as environment characteristics (e.g., weather, time, geographic position where the user is located), music characteristics (e.g., music content), user (e.g. user preference, user's psychological or physical state, music mode selected by the user); and a corresponding overall color scheme is further generated for controlling the lamplight, so that various factors such as environment characteristics and the user are integrated into the music and lamplight, enabling the user to obtain a more perfect and comfortable acousto-optic experience.

The overall color scheme may integrate together emotions and artistic conceptions adapted to the environment characteristics, emotion and artistic conception expressed by the music content, and the emotion and artistic conception required by the user, and is presented and distributed on the plurality of light-emitting components in a color manner. The overall color scheme can dynamically vary, and varies along with music rhythm, to present rhythm sensation of color variation.

In the lamplight control unit 130, the color encoder 131 may comprise at least one of the first color encoder and the second color encoder as necessary. The first color encoder and the second color encoder may be implemented by hardware or software, or a combination thereof.

In embodiments of the present invention, integrated atmosphere lamplight is presented by using the color encoder 131 and the color mixer 132 and controlling the corresponding plurality of light-emitting components (including a display screen), intelligent dynamic lamplight based on multi-dimensional factors (e.g., music, weather, user preference, user state, etc.) may be achieved, and a lamplight presentation scheme which has richer color, richer and more coordinated variation along with music and is more flexible is provided, achieving deep integration of multiple factors, such as music, scenes and lamplight, thereby providing better acousto-optic experience for the user.

In some embodiments, the system 100 is included in an in-vehicle infotainment system of a vehicle; and components emitting the lamplight comprise a plurality of light-emitting components provided in an inner space of the vehicle, and a display screen of the in-vehicle infotainment system. The lamplight control unit 130 can control the color and brightness of light emitted by the plurality of light-emitting components and the display screen of the in-vehicle infotainment system. The display screen of the in-vehicle infotainment system can also display any one of pattern, image or video in synchronization with music, to enable the user on the vehicle to obtain an immersive experience.

The present invention is not limited to applying the system 100 to a vehicle, and the system can also be applied to other occasions, such as performing music and lamplight control on spot of a variety of art performances such as music fountain, concert, movie theater, etc.

Figure 2:
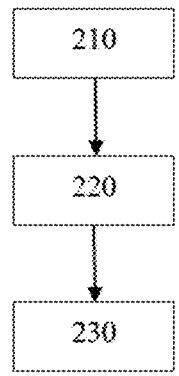
FIG. 2 shows a flowchart of a method for controlling lamplight by using music according to embodiments of the present invention.

FIG. 2 shows a flowchart of a method for controlling lamplight by using music according to embodiments of the present invention. As shown in FIG. 2, the method 200 comprises: analyzing rhythm and content of music (step 220); and dynamically controlling, on the basis of the analysis of the rhythm and content of the music, at least one of color, brightness and variation rhythm of the color and brightness of lamplight emitted by light-emitting components (step 230); wherein the controlling step 230 comprises: generating color coding on the basis of at least one of the rhythm and content of the music; and controlling, on the basis of the color coding, colors of the lamplight emitted by the light-emitting components.

In some embodiments, the method 200 further comprises: selecting, on the basis of situations, music to be played back, such that the music, lamplight and the situations coordinate with one another (step 210); wherein the situations comprise at least one of user preference, weather, time, user state, geographical position where the user is located and volume of music. The user state may comprise at least one of physical fatigue state of the user, psychological state of the user and movement speed of the user.

In some embodiments, the selecting step 210 comprises: selecting a music mode complying with the user preference, wherein the music mode indicates the style of music to be played back; and automatically selecting, according to the selected music mode, music to be played back.

In some embodiments, the analyzing step 220 comprises: analyzing at least one of style, scene and lyrics of the music, extracting features related to the at least one of the style, scene and lyrics of the music, and classifying at least one of the style, scene and lyrics of the music by using a machine learning algorithm; and the controlling step 230 comprises: dynamically controlling color and brightness of the lamplight based at least in part on the classification of at least one of the style, scene and lyrics of the music, and dynamically controlling variation rhythm of the color and brightness of the lamplight based at least in part on situations, and rhythm of the music; wherein the situations comprise at least one of user preference, weather, time, user state, geographical position where the user is located and volume of music.

In some embodiments, the light-emitting components comprise a plurality of light-emitting components; the controlling step 230 further comprises: generating color coding on the basis of emotion or artistic conception expressed by at least one of the rhythm, style, scene and lyrics of the music analyzed in the analyzing step 220; generating a color mixing scheme expressing a plurality of emotions or artistic conceptions on the basis of the generated color coding; and controlling the color of the lamplight emitted by the plurality of light-emitting components on the basis of the color mixing scheme. The color mixing scheme comprises at least one of a combination scheme of a plurality of colors in different spaces, a switching scheme of a plurality of colors in different time periods, and a mixed color scheme of a plurality of colors.

In some embodiments, the controlling step 230 further comprises: generating corresponding first color coding on the basis of the classification of at least one of style, scene and lyrics of the music; wherein the first color coding indicates a light emission color of each of the light-emitting components and/or an overall pattern constituted by light emission colors of the plurality of light-emitting components; and generating control signals for controlling the light emission colors of the plurality of light-emitting components on the basis of the first color coding.

In some embodiments, in the controlling step 230, emotion expressed by light emission colors of the light-emitting components is controlled to coordinate with emotion expressed by at least one of style, scene and lyrics of the music.

In some embodiments, the controlling step 230 comprises: generating second color coding according to a classification label of content of the music; generating third color coding according to situations and the selected music mode; generating combined color coding on the basis of the second color coding and the third color coding; wherein the combined color coding indicates the light emission color of each of the light-emitting components and/or an overall color pattern constituted by the light emission colors of the plurality of light-emitting components; and generating control signals for controlling the light emission colors of the plurality of light-emitting components on the basis of the overall color scheme; wherein the classification label of the content of the music indicates classification of the content of the music; the situations comprise at least one of user preference, weather, time, user state, geographical position where the user is located and volume of music; and the music mode indicates a style of music selected by the user.

A person skilled in the art could understand that the system 100 shown in FIG. 1 and various embodiments thereof can be used to implement the method 200 as shown in FIG. 2, and the system 100 shown in FIG. 1 and various embodiments thereof can also be implemented by using the method 200 and various signal processing and control systems.

Figure 3:
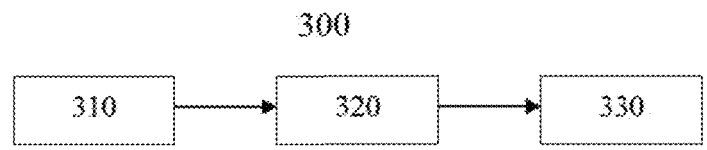
FIG. 3 shows a structural block diagram of an apparatus for providing scene music and atmosphere lamplight according to embodiments of the present invention.

FIG. 3 shows a structural block diagram of an apparatus for providing scene music and atmosphere lamplight according to embodiments of the present invention. As shown, the apparatus 300 comprises: a music playback device 310; a system 320 for controlling lamplight by using music as described in the described embodiments; and a plurality of light-emitting components 330. The system 320 can employ the system 100 as described in the described embodiment. The apparatus 300 can control the lamplight emitted by the light-emitting components 330 by using the music played back by the music playback device 310, so as to achieve integration of music and lamplight, to improve the user experience. In other embodiments, the apparatus 300 can further comprise one or more display screens, for displaying images and/or videos conforming to rhythm and content of the music. In addition, by means of the integration of the display screens and atmosphere lamplight, intelligent dynamic lamplight based on multi-dimensional scenes (for example, comprising music, weather, user preferences, etc.) can be further achieved. For example, two large display screens are provided at the front left direction and front right direction on spot of a large concert, or one display screen is provided directly ahead on spot. The display screens can also form an interactive mode with atmosphere lamplight composed of the light-emitting components 330, and color blocks can flow and transfer, diffuse or converge in multiple directions between the plurality of light-emitting components 330 and the display screens, so as to form a light-emitting effect which is flexible and complies with rhythm and scene of the music.

Figure 4:
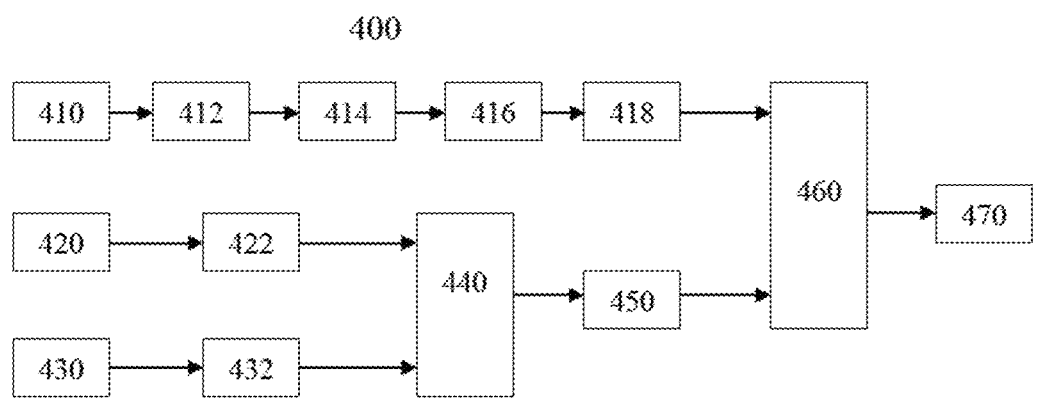
FIG. 4 shows a schematic diagram of a flowchart of an overall method for processing music signals and controlling lamplight in embodiments.

FIG. 4 shows a schematic diagram of a flowchart of an overall method for processing music signals and controlling lamplight in embodiments. As shown in FIG. 4, the method 400 comprises: steps such as music rhythm analysis, music content analysis, music mode selection, color coding, spatial link coding of rhythm and lamplight control. Specifically, in the music rhythm analysis step, an audio source signal wave file of a music signal is first received and pre-processed (sub-step 410), for example, a Hamming window is added to a music signal of 23 ms, fast Fourier Transform (FFT) is performed on data in the Hamming window and a power spectrum is obtained; fast audio source segmentation is performed (sub-step 412); audio clipping is performed (sub-step 414); short-time Fourier Transform (STFT)/Fast Fourier Transform (FFT) is performed on the clipped audio signal, to obtain a spectrogram (sub-step 416); and periodic analysis is performed on the music signal (sub-step 418), to obtain periodic rhythm information of the music signal. In addition, a scenarized rhythm enhancement module can be provided, for further combining scene information (such as weather information, user state, etc.) with the obtained periodic rhythm information of the music signal, so as to achieve further integration of rhythm and scene. In the process of performing music rhythm analysis, the present invention is not limited to the described sub-steps, and other manners may also be used to analyze the rhythm of music.

In the music content analysis step, lyrics of song music are extracted (sub-step 420); and the content of the lyrics is classified by using a natural language processing (NLP) technology, and classification labels are added (sub-step 422), comprising extraction of theme words of the lyrics, semantic environment analysis and emotion analysis of the lyrics and classification of the lyrics, and training of a lyrics classifier (e.g. feature extraction, processing by a machine learning algorithm, prediction processing, classifier model processing, addition of lyrics classification labels, etc.). The music mode selection step comprises: automatically selecting a music mode on the basis of factors such as weather, vehicle speed or music volume, selecting a music mode on the basis of user preference, and intelligently selecting a mode (sub-step 430); and the user can randomly select one mode from selectable music modes (including romantic mode, conversation mode, blessing mode, pregnancy mode, child mode, etc.) to start music playback, and a music playback device automatically plays back music matching the selected music mode (sub-step 432).

On the basis of the lyrics classification labels obtained at sub-step 422 and the music played back at sub-step 432, generating, by means of a two-factor color encoder, color coding corresponding to emotion and artistic conception expressed by the lyrics and the music signal (step 440). The two-factor color encoder is an embodiment of the second color encoder 132 as shown in FIG. 1, and may comprise a label color encoder and a mode color encoder; the label color encoder can perform label color coding on the lyrics according to the lyrics classification labels, and the mode color encoder can perform mode color coding on the music according to weather, user movement speed, music volume and the selected music mode; and then music content labels are sorted and merged by means of combined color coding of both the label color encoder and the mode color coder (step 450). Further, on the basis of the periodic rhythm information of the music signal obtained at sub-step 418, and the sorted and merged music content labels at step 450, the two are combined and linked, to achieve spatial link coding of the rhythm of the music signal, thereby generating overall information of distribution of light emission colors and brightness and lamplight variation rhythm thereof; and control signals are correspondingly generated, for controlling the light emission of light-emitting components and the display of a display screen (such as the display screen of an in-vehicle infotainment system or a display screen of the apparatus 300). These generated control signals will be sent to a controller, to control the light emission of the light-emitting components and the display of the display screen (step 470).

In an example, the content of music can simultaneously express a plurality of emotions and artistic conceptions, for example, primary emotions and secondary emotions, and at this time, there are a plurality of music content labels generated; correspondingly, a color encoder generates a plurality of (for example, corresponding to the emotions and artistic conceptions expressed by the lyrics and song signals) color coding; moreover, when the system 100 controls the plurality of light-emitting components to emit light, lamplight colors (primary colors) corresponding to the primary emotions need to be greater than lamplight colors corresponding to the secondary emotions; or the lamplight colors corresponding to the secondary emotions present a state of flowing or fluctuating in the primary colors.

Embodiments of the present invention can further provide an in-vehicle infotainment system, comprising: a memory in which computer-executable instructions are stored; and at least one processor; the computer-executable instructions, when being executed by the processor, cause the in-vehicle infotainment system to execute the method for controlling lamplight by using music as described in the described embodiment, so as to dynamically control at least one of color, brightness and variation rhythm of the color and brightness of light emitted by a plurality of light-emitting components provided in an inner space of the vehicle and a display screen of the in-vehicle infotainment system.

Figure 5:
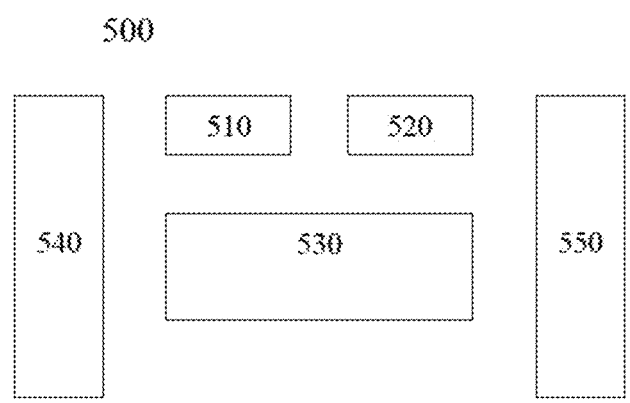
FIG. 5 shows a schematic diagram of distribution of lamplight of light-emitting components and a display screen in embodiments.

FIG. 5 shows a schematic diagram of distribution of lamplight of light-emitting components and a display screen in embodiments. The light-emitting components and the display screen in the apparatus 300 as shown in FIG. 3 can be arranged according to FIG. 5. In this embodiment, light-emitting components 510 and 520 can be arranged above a display screen 530, and light-emitting components 540 and 550 can be arranged on two sides of the display screen 530, so as to form a half-surrounding state to a user. The light-emitting components 510, 520, 540 and 550 can be located at positions close to a front loudspeaker, a left channel loudspeaker and a right channel loudspeaker of a music playback device 310; and by means of mutual integration of music, lamplight and scene, a user obtains an immersive acousto-optic experience.

Figure 6:
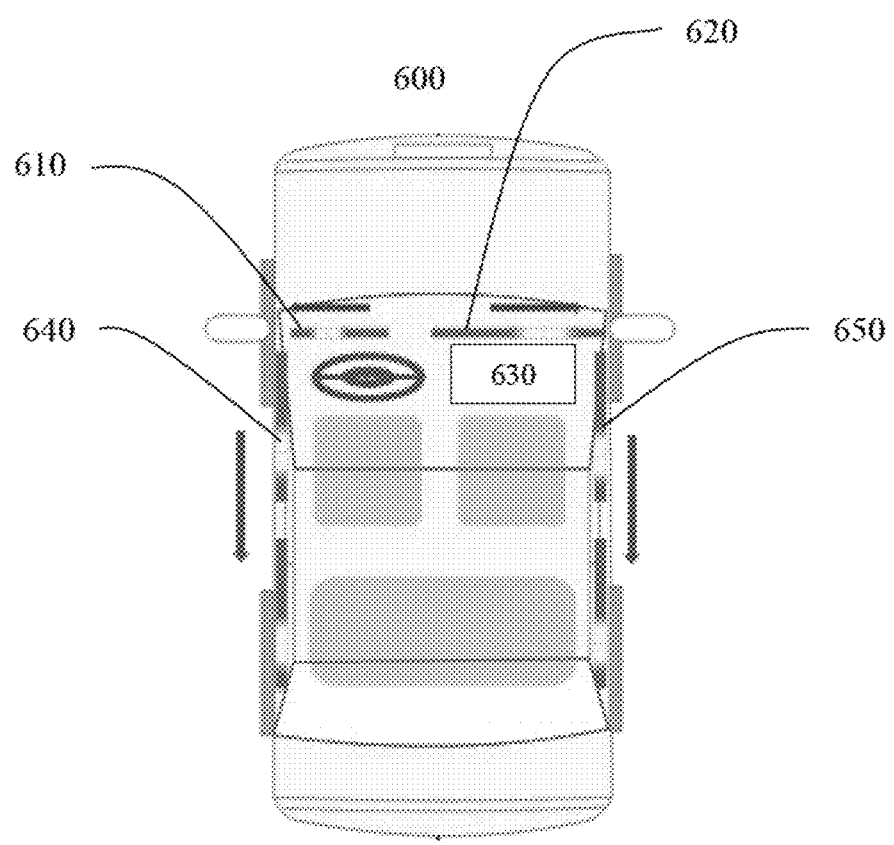
FIG. 6 shows a schematic diagram of a vehicle according to embodiments of the invention.

The disclosure further provides a vehicle, comprising the apparatus for providing scene music and atmosphere lamplight as described in the described embodiment. FIG. 6 shows a schematic diagram of a vehicle 600 according to embodiments of the invention. front light-emitting tubes 610 and 620 and side light-emitting tubes 640 and 650 are provided inside the vehicle 600, and a display screen 630 of an in-vehicle infotainment system (e.g. a Head Unit) is provided near the steering wheel. Under the control of the system 100, the light-emitting tubes 610, 620, 640 and 650 and the display screen 630 can emit, according to rhythm synchronous with music played back by the in-vehicle infotainment system, lamplight integrated with the rhythm and content of the music; and the display screen 630 may further display varying colors and patterns in a video manner. Arrows in FIG. 6 indicate the direction in which color blocks (such as yellow blocks) presented in the light-emitting tubes 610, 620, 640 and 650 flow in the light-emitting tubes. By means of the light-emitting tubes and the display screen, and in combination with a stereo multichannel audio apparatus inside the vehicle 600, as a whole, a user inside the vehicle 600 can obtain an immersive acousto-optic experience.

The description above only relates to preferred embodiments of the present invention, and does not constitute any limitation to the present invention. After understanding the content and principle of the disclosure, a person skilled in the art could make various modifications and variations in form and detail without departing from the principle of the disclosure, and these modifications and variations based on the principle of the disclosure still fall within the scope of protection defined by the claims of the present patent.

The invention claimed is:

1. A head unit system, comprising:
one or more processors; and
a memory containing computer-executable instructions that, when being executed, cause the one or more processors to execute a first system for controlling lamplight by using music, the first system comprising:
a music analysis unit, configured to analyze rhythm and content of music;
a lamplight control unit, configured to dynamically control, based on the analysis of the rhythm and content of the music, at least one of color, brightness and variation rhythm of the color and brightness of lamplight emitted by light-emitting components,
wherein the lamplight control unit comprises a color encoder, the color encoder being configured to generate color coding based on at least one of the rhythm and content of the music; and the lamplight control unit controls, based on the color coding generated by the color encoder, colors of the lamplight emitted by the light-emitting components; and
a music selection unit, configured to select, based on situations, music to be played back, such that the music, the lamplight and the situations coordinate with one another,
wherein the situations comprise at least one of user preference, weather, time, user state, geographical position where the user is located and volume of music; and wherein the user state comprises at least one of physical fatigue state of the user, psychological state of the user and movement speed of the user.

2. The head unit system according to claim 1, wherein the music selection unit comprises a music mode selection unit, the music mode selection unit being configured to allow the user to select a music mode complying with the user preference on the music mode selection unit, wherein the music mode indicates the style of music to be played back; and the music selection unit automatically selects, according to the selected music mode, music to be played back.

3. The head unit system according to claim 1, wherein the music analysis unit comprises:
a music rhythm analysis module, configured to analyze rhythm of the music; and
a music content analysis module, configured to analyze content of the music.

4. The head unit system according to claim 3, wherein the music content analysis module is further configured to analyze at least one of style, scene and lyrics of the music, to extract features related to at least one of the style, scene and lyrics of the music, and to classify at least one of the style, scene and lyrics of the music by using a machine learning algorithm; and
the lamplight control unit is further configured to dynamically control color and brightness of the lamplight based at least in part on the classification of at least one of the style, scene and lyrics of the music, and to dynamically control variation rhythm of the color and brightness of the lamplight based at least in part on the situations and the analysis of the rhythm analysis module.

5. The head unit system according to claim 1, wherein the light-emitting components comprise a plurality of light-emitting components; the lamplight control unit further comprises a color mixer;
wherein the color encoder is configured to generate the color coding based on emotion or artistic conception expressed by at least one of rhythm, style, scene and lyrics of the music analyzed by the music analysis unit; the color mixer is configured to generate a color mixing scheme expressing a plurality of emotions or artistic conceptions based on the generated color coding; and the lamplight control unit is configured to control, based on the color mixing scheme, colors of the lamplight emitted by the plurality of light-emitting components.

6. The head unit system according to claim 5, wherein the color mixing scheme comprises at least one of a combination scheme of a plurality of colors in different spaces, a switching scheme of a plurality of colors in different time periods, and a mixed color scheme of a plurality of colors.

7. The head unit system according to claim 1, wherein the color encoder comprises a first color encoder, the first color encoder being configured to generate corresponding first color coding based on the classification of at least one of rhythm, style, scene and lyrics of the music; wherein the first color coding indicates a light emission color of each of the light-emitting components and/or an overall pattern constituted by light emission colors of the plurality of light-emitting components; and
the lamplight control unit is further configured to generate, based on the first color coding, control signals for controlling light emission colors of the plurality of light-emitting components.

8. The head unit system according to claim 7, wherein the lamplight control unit controls emotion or artistic conception expressed by light emission colors of the light-emitting components to coordinate with emotion or artistic conception expressed by at least one of style, scene, and lyrics of the music.

9. The head unit system according to claim 1, wherein the color encoder comprises a second color encoder, the second color encoder comprising a label color encoder and a mode color encoder;
wherein the label color encoder is configured to generate second color coding according to classification labels of rhythm and/or content of the music; the mode color encoder is configured to generate third color coding according to the situations and the selected music mode; and the second color encoder is further configured to generate combined color coding based on the second color coding and the third color coding; wherein the combined color coding indicates a light emission color of each of the plurality of light-emitting components and/or an overall color scheme constituted by light emission colors of the plurality of light-emitting components;
wherein classification labels of content of the music indicate classification of the content of the music; and the music mode indicates style of music selected by the user; and
wherein the lamplight control unit is further configured to generate, based on the overall color scheme, control signals for controlling light emission colors of the plurality of light-emitting components.

10. The head unit system according to claim 1, wherein the first system is included in an in-vehicle infotainment system of a vehicle; wherein components emitting the lamplight comprise the light-emitting components provided in an inner space of the vehicle, and a display screen of the in-vehicle infotainment system.

11. A method for controlling lamplight by using music, comprising:
analyzing rhythm and content of music;
dynamically controlling, based on the analysis of the rhythm and content of the music, at least one of color, brightness and variation rhythm of the color and brightness of lamplight emitted by light-emitting components,
wherein the controlling step comprises: generating color coding based on at least one of the rhythm and content of the music; and controlling, based on the color coding, colors of the lamplight emitted by the light-emitting components; and
selecting, based on situations, music to be played back, such that the music, the lamplight and the situations coordinate with one another,
wherein the situations comprise at least one of user preference, weather, time, user state, geographical position where the user is located and volume of music; and
wherein the user state comprises at least one of physical fatigue state of the user, psychological state of the user and movement speed of the user.

12. The method according to claim 11, wherein the selecting step comprises: selecting a music mode complying with the user preference, wherein the music mode indicates the style of music to be played back; and automatically selecting, according to the selected music mode, music to be played back.

13. The method according to claim 11, wherein the analyzing step comprises: analyzing at least one of style, scene and lyrics of the music, extracting features related to at least one of the style, scene and lyrics of the music, and classifying at least one of the style, scene and lyrics of the music by using a machine learning algorithm; and
the controlling step comprises: dynamically controlling color and brightness of the lamplight based at least in part on the classification of at least one of the style, scene and lyrics of the music, and dynamically controlling variation rhythm of the color and brightness of the lamplight based at least in part on the situations, and rhythm of the music.

14. The method according to claim 11, wherein the light-emitting components comprise a plurality of light-emitting components; the controlling step further comprises:
generating the color coding based on emotion or artistic conception expressed by at least one of rhythm, style, scene and lyrics of the music analyzed in the analyzing step;
generating a color mixing scheme expressing a plurality of emotions or artistic conceptions based on the generated color coding; and
controlling, based on the color mixing scheme, colors of the lamplight emitted by the plurality of light-emitting components.

15. The method according to claim 14, wherein the color mixing scheme comprises at least one of a combination scheme of a plurality of colors in different spaces, a switching scheme of a plurality of colors in different time periods, and a mixed color scheme of a plurality of colors.

16. The method according to claim 14, wherein in the controlling step, emotion expressed by light emission colors of the light-emitting components is controlled to coordinate with emotion expressed by at least one of style, scene and lyrics of the music.

17. The method according to claim 11, wherein the controlling step further comprises:
generating corresponding first color coding based on the classification of at least one of rhythm, style, scene and lyrics of the music; wherein the first color coding indicates a light emission color of each of the light-emitting components and/or an overall pattern constituted by light emission colors of the plurality of light-emitting components; and
generating, based on the first color coding, control signals for controlling light emission colors of the plurality of light-emitting components.

18. The method according to claim 11, wherein the controlling step comprises:
generating second color coding according to classification labels of rhythm and/or content of the music;
generating third color coding according to the situations and the selected music mode;
generating combined color coding based on the second color coding and the third color coding; wherein the combined color coding indicates a light emission color of each of the plurality of light-emitting components and/or an overall color scheme constituted by light emission colors of the plurality of light-emitting components; and
generating, based on the overall color scheme, control signals for controlling light emission colors of the plurality of light-emitting components;
wherein classification labels of content of the music indicate classification of the content of the music; and the music mode indicates style of music selected by the user.

19. An apparatus for providing scene music and atmosphere lamplight, comprising:
a plurality of light-emitting components;
a music playback device; and
a system for controlling lamplight by using music, comprising:
a music analysis unit, configured to analyze rhythm and content of music; and
a lamplight control unit, configured to dynamically control, based on the analysis of the rhythm and content of the music, at least one of color, brightness and variation rhythm of the color and brightness of lamplight emitted by light-emitting components,
wherein the lamplight control unit comprises a color encoder, the color encoder being configured to generate color coding based on at least one of the rhythm and content of the music; and the lamplight control unit controls, based on the color coding generated by the color encoder, colors of the lamplight emitted by the light-emitting components; and
a music selection unit, configured to select, based on situations, music to be played back, such that the music, the lamplight and the situations coordinate with one another,
wherein the situations comprise at least one of user preference, weather, time, user state, geographical position where the user is located and volume of music; and wherein the user state comprises at least one of physical fatigue state of the user, psychological state of the user and movement speed of the user.

20. The apparatus according to claim 19, wherein the apparatus is configured in a vehicle and wherein components emitting the lamplight comprise the light-emitting components provided in an inner space of the vehicle, and a display screen of an in-vehicle infotainment system.

21. The apparatus according to claim 19, wherein the music selection unit comprises a music mode selection unit, the music mode selection unit being configured to allow the user to select a music mode complying with the user preference on the music mode selection unit, wherein the music mode indicates the style of music to be played back; and
the music selection unit automatically selects, according to the selected music mode, music to be played back.

22. The apparatus according to claim 19, wherein
the music analysis unit comprises: a music rhythm analysis module, configured to analyze rhythm of the music; and a music content analysis module, configured to analyze content of the music;
the music content analysis module is further configured to analyze at least one of style, scene and lyrics of the music, to extract features related to at least one of the style, scene and lyrics of the music, and to classify at least one of the style, scene and lyrics of the music by using a machine learning algorithm; and
the lamplight control unit is further configured to dynamically control color and brightness of the lamplight based at least in part on the classification of at least one of the style, scene and lyrics of the music, and to dynamically control variation rhythm of the color and brightness of the lamplight based at least in part on the situations and the analysis of the rhythm analysis module.

23. The apparatus according to claim 19, wherein the light-emitting components comprise a plurality of light-emitting components; the lamplight control unit further comprises a color mixer;
wherein the color encoder is configured to generate the color coding based on emotion or artistic conception expressed by at least one of rhythm, style, scene and lyrics of the music analyzed by the music analysis unit; the color mixer is configured to generate a color mixing scheme expressing a plurality of emotions or artistic conceptions based on the generated color coding; and the lamplight control unit is configured to control, based on the color mixing scheme, colors of the lamplight emitted by the plurality of light-emitting components.

\* \* \* \* \*